United States Patent [19]

Chamberlin et al.

[11] 4,011,160

[45] Mar. 8, 1977

[54] PROCESS OF USING OXAZOLINE AND/OR OXAZINE-MODIFIED POLYMERS

[75] Inventors: Thomas A. Chamberlin; Norman L. Madison, both of Midland, Mich.

[73] Assignee: The Dow Chemical Company, Midland, Mich.

[22] Filed: Dec. 9, 1975

[21] Appl. No.: 639,152

Related U.S. Application Data

[62] Division of Ser. No. 554,380, March 3, 1975.

[52] U.S. Cl. .................................. 210/40; 162/29
[51] Int. Cl.$^2$ ...................................... B01D 15/00
[58] Field of Search ............... 162/16, 29; 210/24, 210/40; 260/2.5 R, 2.5 AM, 2.5 M, 2.5 N, 2.5 B, 2.5 H

[56] References Cited

UNITED STATES PATENTS 3,597,351  8/1971  Landenburg et al. ............... 162/29
3,652,407  3/1972  Paleos ............................... 210/40

*Primary Examiner*—Charles N. Hart
*Assistant Examiner*—Ivars Cintins
*Attorney, Agent, or Firm*—L. Wayne White

[57] ABSTRACT

Novel polymers are described herein which are particularly useful in removing phenolics from waste streams. The polymers are prepared by reacting an oxazoline or oxazine (preferably 2-methyl or ethyl-2-oxazoline) with a cross-linked vinylaromatic polymer bearing pendant halomethyl groups on the aromatic rings. Macroporous beads prepared by reacting cross-linked chloromethylated polystyrene with 2-methyl and/or 2-ethyl-2-oxazoline are particularly useful embodiments in removing phenolics from aqueous waste streams and are used to remove phenolics (e.g. tannins) and other color-bodies from bleached Kraft pulp effluent.

5 Claims, No Drawings

PROCESS OF USING OXAZOLINE AND/OR OXAZINE-MODIFIED POLYMERS

This is a division, of application Ser. No. 554,380 filed Mar. 3, 1975.

BACKGROUND OF THE INVENTION

Economic and environmental considerations necessitate the removal of phenolics from waste streams. Pollution of aqueous waste streams with phenolics (e.g. phenolic dyes, tannins, etc.) is particularly insidious from an environmental point of view due to the known toxicity and objectionable color of phenolics.

Previous methods of purifying such aqueous waste streams have generally been time consuming, difficult and/or costly. Such methods have included biological methods (activated sludges or trickling filtration), ozone treatments and/or filtration through activated carbon.

To illustrate the problems, the biological systems can only be used to remove very minor amounts of the phenol; the ozone treatment requires extremely careful monitoring to match ozone with the particular phenol(s), a value which differs between phenolics; and the activated carbon system is extremely susceptible to plugging by organic matter. Removal of phenolics from organic media is even more difficult.

Thus, there exists a need for a new method of economically and conveniently removing phenolics from waste streams.

SUMMARY OF THE INVENTION

We have discovered a new class of graft copolymers which are particularly useful for removing phenolics from phenolic solutions. Their use in this regard and our method of preparing the instant graft copolymers are also novel.

The instant invention is a liquid-permeable, water-insoluble, synthetic resinous body, capable of removing phenol from a phenol solution passing therethrough, comprising a cross-linked vinyl-addition polymer whose backbone contains a plurality of units corresponding to the formula

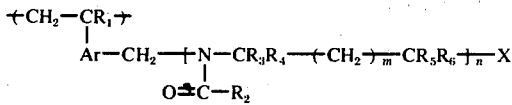

wherein:

$R_1$ is hydrogen or methyl (preferably hydrogen);

$R_2$ is hydrogen, phenyl or alkyl of from 1 to about 24 carbon atoms (preferably alkyl and most preferably methyl or ethyl);

$R_3$–$R_6$ are each independently hydrogen, lower alkyl or hydroxy-substituted lower alkyl (preferably $R_3$ and $R_4$ are hydrogen, methyl, ethyl or hydroxymethyl, and $R_5$ and $R_6$ are hydrogen, most preferably $R_3$–$R_6$ are each hydrogen), with the proviso that at least two of $R_3$–$R_6$ are hydrogen;

Ar is a carbocyclic aromatic nucleus (preferably a benzene nucleus);

$m$ is 0 or 1 (preferably 0);

$n$ is an integer of at least one (preferably from 1 to about 10, and most preferably from 1 to 5); and X is a terminal organic group.

DETAILED DESCRIPTION OF THE INVENTION

The instant graft copolymers are conveniently prepared by reacting a cross-linked poly(vinylaromatic) resin bearing a plurality of ar-halomethyl groups with an oxazoline or oxazine.

THE POLY(VINYLAROMATIC) RESINS

The poly(vinylaromatic) resins suitable for use as reactants in making the instant graft co-polymers are a known class of polymers whose structures comprise a plurality of units corresponding to the formula

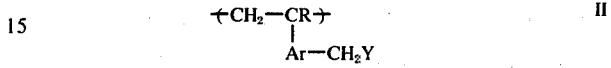

wherein R and Ar have the aforesaid meaning and Y is chloro, bromo or iodo. Such polymers are normally solid, benzene-insoluble interpolymers and have been used extensively as the polymer matrix in ion-exchange resins. They have been typically prepared by (1) halomethylating (e.g. chloromethylating) a cross-linked or cross-linkable poly(vinylaromatic) resin or by (2) interpolymerizing a halomethylated vinylaromatic monomer with suitable cross-linking agents. The cross-linked resins in each of (1) and (2) are produced by conventional polymerization techniques using, typically, from about 0.5 to about 40 weight percent of cross-linker (preferably from about 0.5 to about 20 weight percent cross-linker). Suspension-polymerization techniques are particularly useful in forming cross-linked micro- or macro-reticular beads (alternatively referred to in the literature as micro- or macroporous beads).

Halomethylated polymers produced by procedure (1) above are illustrated, for example, by U.S. Pat. Nos. 2,614,099, 3,549,562 and U.S. Pat. Reissue No. 27,026 (the disclosures of which are incorporated by reference). Such polymers bear an average of from about 0.2 to about 1.5 halomethyl groups per aromatic nucleus and are, of course, quite satisfactory as reactants in preparing the instant graft co-polymers.

Illustrative of this class of halomethylated polymers are polymers of vinylaromatic compounds (e.g. styrene, α-methylstyrene, ar-chlorostyrene, vinyltoluene, vinylnaphthalene, and the like, and interpolymers thereof) cross-linked with polyvinyl aromatic compounds (e.g. divinylbenzene, trivinylbenzene, divinyltoluene, divinylxylene, divinylnaphthalene, and the like, and mixures thereof) which have been subsequently halomethylated using conventional techniques. E.g., by reacting the polymers with formaldehyde and HCl or HBr, or by reacting the polymers with chloromethyl methyl ether, etc.

Halomethylated polymers produced by procedure (2) above are illustrated, for example, by U.S. Pat. No. 3,843,566 (the disclosure of which is incorporated herein by reference). Such polymers are likewise satisfactory as reactants in preparing the instant graft co-polymers. Illustrative of polymers in this regard are the polymers of ar-vinylbenzyl chloride cross-linked with divinylbenzene, as described in U.S. Pat. No. 3,843,566.

The chloromethylated poly(vinylaromatic) polymers are the most commercially available and are, therefore, preferred reactants. The most preferred reactants are the products of chloromethylated polystyrenes cross-linked with divinylbenzene.

The physical form of the halomethylated vinylaromatic polymers above may be varied to convenience. For example, the polymer may be in the form of a film (i.e. a permeable membrane), fibers, porous particles, beads, etc. Of these, the porous beads are the preferred embodiments and the macroporous beads are the most preferred embodiments. Methods of preparing such halomethylated vinylaromatic polymers as macroporous beads are described, for example, in U.S. Pat. No. 3,549,562 and U.S. Pat. RE No. 27,026 and U.S. Pat. No. 3,843,566.

THE OXAZOLINE AND OXAZINE REACTANTS

The oxazoline and oxazine reactants used herein are likewise a known class of compounds which are represented by the formula

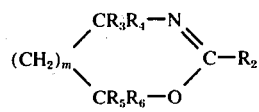

III wherein:
$R_2$ is hydrogen, phenyl or alkyl of from 1 to about 24 carbon atoms (preferably alkyl and most preferably methyl or ethyl);
$R_3$–$R_6$ are each independently hydrogen, lower alkyl or hydroxy-substituted lower alkyl (preferably hydrogen, methyl, ethyl or hydroxymethyl, most preferably hydrogen), with the proviso that at least two of $R_3$–$R_6$ are hydrogen; and
$m$ is 0 or 1 (preferably 0).

The oxazoline reactants are currently preferred over the oxazine reactants, due to commercial availability. The most preferred reactants are 2-methyl-2-oxazoline and 2-ethyl-2-oxazoline.

PREPARATION OF THE GRAFT COPOLYMERS

The instant graft copolymers are conveniently prepared by contacting the vinylaromatic polymer II with the oxazine or oxazoline III at a temperature sufficient to produce a convenient rate of reaction. This reaction is facilitated by conducting it in a liquid reaction medium which dissolves III and is preferably conducted in a reaction medium which dissolves III, swells II and is a poor or non-solvent for polyoxazolines or polyoxazines. Suitable such liquid reaction media include perchloroethylene, cyclohexane, petroleum distillates, benzene, toluene, xylene, and other like hydrocarbons. Toluene is the current solvent of choice. In such liquid reaction media convenient reaction rates have been observed at temperatures of from about 40° to about 150° C. The ratio of II to III in the process can be varied but we normally prefer to add from about 0.5 to about 10 equivalents (most preferably from about 1 to about 5 equivalents) of III per ar-halomethyl equivalent in the polymer.

THE GRAFT COPOLYMERS

The instant graft copolymers are solid, liquid-permeable, water-insoluble, synthetic resins capable of removing phenol from a phenol solution in contact with the resin, and comprise a cross-linked vinyl-addition polymer whose backbone contains a plurality of units corresponding to formula I set forth above.

UTILITIES FOR THE GRAFT COPOLYMERS

In use, the instant graft copolymers are contacted with the phenol contaminated liquid. In so doing, the phenolic contaminant is retained by the graft copolymer and the purified liquid can then be subsequently treated, discharged or recycled at the user's convenience. For example, the graft copolymers may be used in the form of beads to form a packed column or filter bed through which the contaminated phenolic stream may pass for purification. When the instant polymers have reached their capacity in sorbing or otherwise removing phenol from a waste stream, the phenol retained by the resin can be removed and the resin regenerated by merely contacting the resin with aqueous sodium hydroxide.

The term "phenolics" as used herein includes phenol and other aromatics bearing one or more phenolic hydroxyl groups (resorcinol, hydroquinone, chlorophenol, p-hydroxybenzoic acid, tannic acid, phenolsulfonic acid, phenoldisulfonic acid, etc. Such phenols can be removed from either aqueous or organic solution.

EXPERIMENTAL

EXAMPLES 1–15

Conventional macroporous cross-linked polystyrene beads were prepared by suspension polymerization of styrene (51.7 parts by weight) and divinylbenzene (3.3 parts by weight) in a hydrocarbon diluent (45 parts by weight). The beads were substantially chloromethylated using chloromethyl methyl ether. The chloromethylated beads contained an average of from about 0.8 to about 1.0 chloromethyl groups per aromatic nucleus.

The chloromethylated beads (15.3 g) were slurried with potassium iodide (1.7 g) in 200 ml. of methanol. The slurry was heated to reflux, maintained at that temperature for 1 hour and cooled. The solid resin was then recovered by filtration, air-dried and slurried in 200 ml. of toluene for 30 minutes to an hour; the toluene swelled the beads to almost twice their dry volume. The toluene slurry was heated to reflux and residual methanol was removed as a toluene/methanol azeotrope. Subsequently, the slurry was cooled to 90° C., 2-ethyl-2-oxazoline (49.5 g) was added, and the resulting slurry heated at reflux for 14 hours. The graft-copolymer was filtered from the reaction mixture; washed with methanol, water and again with methanol; and air-dried at room temperature. The dry graft-copolymer (53.4 g) had the following analysis: %C=62.3; %H=8.28; %N=9.78; %Cl=5.50; %I=0.29. Analysis of the toluene filtrate by vapor phase chromatography indicated that 83 percent of the oxazoline reactant was consumed. The graft-copolymer prepared above is listed as Example 1 in Table I.

Other graft-copolymers were prepared by an analogous procedure except the ratio of divinylbenzene (DVB) and diluent was varied and/or the ratio of oxazoline reactant to the number of chloromethyl groups was varied, as reported in Table I.

It was noted that small amounts of iodide, or even bromide, ion tended to catalyze the reaction between the chloromethylated polystyrene beads and the oxazoline reactant.

Explanation of data in Table I:
Column 1 shows the amount of divinylbenzene (DVB) and diluent used in making the porous polystyrene.

All of the beads were chloromethylated with chloromethyl methyl ether and contained an average of from about 0.8 to about 1.0 chloromethyl groups per aromatic nucleus. Column 2 shows the molar ratio of oxazoline reactant used per chloromethyl group in the subsequent reaction.

Column 3 shows the weight percent of oxazoline in the reaction product.

$$y = \log \Delta(ppm\ Pt) \times \frac{Kg\ solution}{m^3\ resin}$$

where $\Delta(ppm\ Pt)$ is the difference in color between the treated and untreated liquors. The plot of said x and y values is a straight line. The antilog (y) when x is 3 is taken as the capacity of the resin.

Table I

| Ex. | DVB/Diluent | 2-Ethyl-2-Oxazoline/-CH$_2$Cl group | Oxazoline in Product(wt.%) | Surface Area (m$^2$/g) | Porosity (Volume%) | Median Pore Size (A) | Capacity[a] |
|---|---|---|---|---|---|---|---|
| 1 | 4/45 | 5/1 | 71.4 | NM | NM | NM | 51 |
| 2 | 4/47 | 5/1 | 75.5 | NM | NM | NM | 19 |
| 3 | 6/42 | 5/1 | 73.2 | NM | NM | NM | 2 |
| 4 | 6/45 | 5/1 | 73.0 | NM | NM | NM | 21 |
| 5 | 4/45 | 2/1 | 47.8 | 17.9 | 31.4 | <350 | 110 |
| 6 | 4/47 | 2/1 | 55.0 | 20.4 | 41.2 | 600 | 75 |
| 7 | 6/42 | 2/1 | 54.4 | 23.0 | 26.9 | 200 | 24 |
| 8 | 6/45 | 2/1 | 44.0 | NM | NM | NM | 33 |
| 9 | 8/43 | 2/1 | 51.5 | 33.4 | 43.2 | 500 | 51 |
| 10 | 6/44 | 1/1 | 38.3 | 6.6 | 14.0 | 400 | 130 |
| 11 | 6/45 | 1/1 | 36.7 | 14.5 | 29.9 | 400 | 69 |
| 12 | 6/47 | 1/1 | 37.8 | 17.5 | 32.2 | 400 | 89 |
| 13 | 6/50 | 1/1 | 34.1 | 19.7 | 57.0 | 1400 | 2 |
| 14 | 6/54 | 1/1 | 39.5 | 15.3 | 64.7 | 4000 | 3 |
| 15 | 8/60 | 1/1 | 24.0 | 2.9 | 72.8 | 250,000 | 4 |

[a]See discussion for definition of capacity.
NM in Table I means not measured.

Column 4 shows the surface area in the "oxazolinated" beads. The surface area of the beads was determined by gas (N$_2$) adsorption on the surface and is expressed in meters$^2$/gram (m$^2$/g). The test was conducted using a commercial instrument sold by Strohlein.

The porosity of the beads was determined by immersing the beads in mercury and pressuring the system to force mercury into the pores. The pore size is measured as a function of pressure (relative to a standard). This test was conducted on a commercial apparatus sold by American Instrument Company. The porosity is expressed as volume percent (i.e. the percent of bead volume which is "open" as pores), and the data summarized in Column 5. The median pore size was determined from the above test and is expressed in angstroms (A), as reported in Column 6.

The measurement of "capacity" in Column 7 is a measure of effectiveness in removing color-bodies from a bleached Kraft-pulp mill effluent. Experimentally, the color of a typical bleached Kraft-pulp mill effluent was measured by a spectrophotometer against a standard platinum solution, as described in NCASI bulletin number 253, and expressed as parts per million (ppm) platinum equivalent color units. The NCASI bulletin is a publication of the National Council of the Paper Industry for Air and Stream Improvement, Inc., 103 Park Ave., N.Y., NY 10017. An aliquot of the mill effluent was then shaken with a known bulk volume of graft-copolymer beads for 1 hour at ambient temperature. The color remaining in the liquor over the beads was then determined. This data was then plotted in a Freundlich isotherm using as the coordinates:

| x-axis | log (color remaining) |
| y-axis | log (kilograms of platinum equivalents of color sorbed per meter$^3$ of resin) |

This allows the calculation of the y-value by using the mathematical formula:

EXAMPLE 16–26

In like manner, other graft-copolymers were prepared from a cross-linked polystyrene having a DVB/Diluent ratio of 6/45 in Examples 16–23 and a DVB/Diluent ratio of 4/47 in Examples 24–26. Additionally, various 2-substituted-2-oxazolines were used in this series of experiments (the 2-substituent is identified under "R" in Table II). The graft-copolymers were evaluated in a manner explained above and the results summarized in Table II.

TABLE II

| Ex. | Oxazoline/-CH$_2$Cl groups | R in 2-R-2--Oxazoline | Oxazoline in Product(wt.%) | Capacity |
|---|---|---|---|---|
| 16 | 1/1 | C$_2$H$_5$ | 39.0 | 219 |
| 17 | 2/1 | C$_2$H$_5$ | 44.0 | 133 |
| 18 | 3/1 | C$_2$H$_5$ | 63.6 | 282 |
| 19 | 5/1 | C$_2$H$_5$ | 73.0 | 21 |
| 20 | 1/1 | CH$_3$ | 27.9 | 28 |
| 21 | 2/1 | CH$_3$ | 57.5 | 429 |
| 22 | 5/1 | CH$_3$ | 72.5 | 44 |
| 23 | 2/1 | C$_7$H$_{15}$ | 45 | * |
| 24 | 5/1 | CH$_3$ | 72.5 | 141 |
| 25 | 2/1 | C$_{11}$H$_{23}$ | 63.0 | * |
| 26 | 2/1 | C$_2$H$_5$ | 46.0 | 67 |

*Resin did not wet and no color, therefore, was sorbed by the graft-copolymer.

The data in Tables I and II support the following conclusions when viewed from the point of making a graft-copolymer having the optimum properties in removing color-bodies from bleached Kraft-pulp mill effluent:

a. graft-copolymers prepared from 2-methyl or 2-ethyl-2-oxazoline are preferred over copolymers prepared from other 2-substituted-2-oxazolines;

b. a ratio of from 1 to 3 oxazoline equivalents per chloromethyl equivalent is preferred; and c. the graft-copolymers having a macroporous bead structure with a surface area greater than 10 meters$^2$/gram and a median pore size greater than about 200 A are preferred.

The preceding conclusions are limited to preferences in the graft-copolymers used to decolorize the bleached Kraft-pulp mill effluent and do not apply to the graft-copolymers in general which are useful in removing phenols from waste streams. For example, two of the instant graft-copolymers (in the form of macroporous beads as above) which differed essentially only in median pore size (620 A & 400 A) gave quite different results in decolorizing the above bleached Kraft-pulp mill effluent (101 & 41 capacity) but were essentially the same in their ability to remove phenol from aqueous solution (50 & 45) milligrams of phenol per gram of resin).

EXAMPLE 27

Following the procedures set forth above, 2-ethyl-2-oxazoline was reacted with a chloromethylated, macroporous poly(styrene-DVB) bead bearing an average of from about 0.8 to about 0.9 chloromethyl groups per aromatic nucleus. A ratio of about 1.1 equivalent of oxazoline per chloromethyl equivalent was used and the final product contained about 68 weight percent of oxazoline in chemically combined form. The final product also had a surface area of 20.1 m$^2$/g; a porosity of 16.1 percent; a median pore size of 550 A; and a capacity of 77 in decolorizing a bleached Kraft-pulp mill effluent in the above procedure. An infrared spectrum of the final product in a KBr pellet indicated the presence of both carboxamide and ester carbonyl bands in relative amounts of 1.08 to 1.00, respectively. Titration of the final product indicated the presence of secondary and/or tertiary amino nitrogen to the extent of 2.26 milliequivalents per gram meq/g) of dry bead weight and 0.03 meq/g of quaternary ammonium nitrogen. This analytical data supports the presence of the following groups in the final product

TABLE III

| Bed Volumes Passed | Accumulated Exit Stream Color(ppm Pt) | Reduction in Color (%) |
|---|---|---|
| 1.9 | 0 | 100.0 |
| 3.9 | 86 | 99.2 |
| 5.8 | 232 | 97.9 |
| 9.6 | 603 | 94.6 |
| 11.6 | 797 | 92.8 |
| 15.4 | 1160 | 89.5 |
| 19.2 | 1480 | 86.7 |
| 23.1 | 1773 | 82.8 |
| 26.9 | 2052 | 81.5 |

The efficiency of the beads in removing color-bodies from the bleached Kraft-pulp mill effluent was restored by washing the "spent" beads with aqueous sodium hydroxide.

The above beads were effective in removing color from aqueous waste pulp streams having a wide pH range (pH values of from 1.5 to 12).

EXAMPLES 30–32

Samples (0.5 g) of the resins identified in Tables I and II were shaken for 60 minutes with 15 ml. of 0.1 molar solutions of phenol in cyclohexane and the percent of extracted phenol measured. The results are summarized in Table IV.

TABLE IV

| Ex. | R$_2$ in I | Phenol Extracted (%) |
|---|---|---|
| 4 | C$_2$H$_5$ | 26.1 |
| 23 | C$_7$H$_{15}$ | 25.3 |
| 25 | C$_{11}$H$_{23}$ | 64.8 |

In a similar series of experiments it was observed that

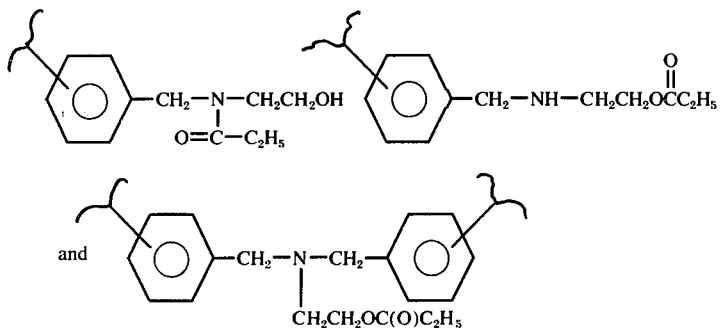

An experimental effort was made to determine the operational characteristics of the aforementioned beads. To wit: A bleached Kraft-pulp mill effluent containing 4.7 parts of the caustic extract and 1.0 part of the chlorination extract from the bleaching process was filtered through a filter bed of 30–60 mesh sand to remove residual cellulose fibers. The filtered effluent (pH 5.7; color 11,100 ppm Pt, as per NCASI standard test above) was passed into and through a column packed with 0.5 cubic feet of the above beads at a flow rate of 0.48 gallons per minute. The exit stream from the column was collected and its color continuously monitored. The data are summarized in Table III.

macroporous beads prepared as above using 2-ethyl-2-oxazoline were highly effective in removing phenol, m-chlorophenol, m-methoxyphenol, tannic acid and even p-toluenesulfonic acid and m,m'-biphenyldisulfonic acid from dilute aqueous solutions thereof (e.g. 0.001 molar solutions).

What is claimed is:

1. A process for removing phenolics from a phenol solution comprising contacting said solution with a liquid-permeable, water-insoluble, synthetic resinous body, capable of removing a phenol from a phenol solution in contact therewith, comprising a cross-linked vinyl-addition polymer whose backbone contains a plurality of units corresponding to the formula

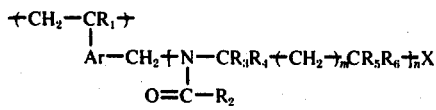

wherein:
- $R_1$ is hydrogen or methyl;
- $R_2$ is hydrogen, phenyl or alkyl of from 1 to about 24 carbon atoms;
- $R_3$–$R_6$ are each independently hydrogen, lower alkyl or hydroxy-substituted lower alkyl, with the proviso that at least two of $R_3$–$R_6$ are hydrogen;
- Ar is a carbocyclic aromatic nucleus;
- $m$ is 0 or 1;
- $n$ is an integer of at least 1; and
- X is Cl, Br, I, or OH.

2. A process for decolorizing and removing phenolics from an aqueous bleach Kraft-pulp effluent comprising contacting said effluent with a liquid-permeable, water-insoluble, synthetic resinous body, capable of removing a phenol from a phenol solution in contact therewith, comprising a cross-linked vinyl-addition polymer whose backbone contains a plurality of units corresponding to the formula

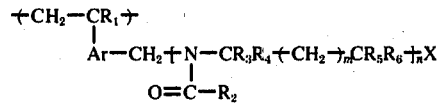

wherein:
- $R_1$ is hydrogen or methyl;
- $R_2$ is hydrogen, phenyl or alkyl of from 1 to about 24 carbon atoms;
- $R_3$–$R_6$ are each independently hydrogen, lower alkyl or hydroxy-substituted lower alkyl, with the proviso that at least two of $R_3$–$R_6$ are hydrogen;
- Ar is a carbocyclic aromatic nucleus;
- $m$ is 0 or 1;
- $n$ is an integer of at least 1; and
- X is Cl, Br, I, or OH.

3. The process defined by claim 2 wherein said resinous body is in the form of a macroporous bead.

4. The process defined by claim 3 wherein $R_1$ is hydrogen; $R_2$ is methyl or ethyl; $R_3$ and $R_4$ are hydrogen, methyl, ethyl or hydroxymethyl and $R_5$ and $R_6$ are each hydrogen; and n is an integer of from 1 to 10, inclusive.

5. The process defined by claim 4 wherein $R_3$–$R_6$ are each hydrogen and $n$ is an integer of from 1 to 5, inclusive.

* * * * *